(12) United States Patent
Tokumaru et al.

(10) Patent No.: US 8,936,363 B2
(45) Date of Patent: Jan. 20, 2015

(54) POLARIZING LENS MADE OF AROMATIC POLYCARBONATE

(71) Applicants: Mitsubishi Gas Chemical Company, Inc., Tokyo (JP); MGC Filsheet Co., Ltd., Tokorozawa-shi (JP)

(72) Inventors: Terutaka Tokumaru, Tokyo (JP); Katsunori Suzuki, Tokyo (JP); Ken Shimomai, Tokyo (JP); Masaki Yagoura, Tokyo (JP); Kyousuke Nakamura, Tokyo (JP); Akio Ohkubo, Tokyo (JP)

(73) Assignees: Mitsubishi Gas Chemical Company, Inc., Tokyo (JP); MGC Filsheet Co., Ltd., Tokorozawa-shi (JP)

( * ) Notice: Subject to any disclaimer, the term of this patent is extended or adjusted under 35 U.S.C. 154(b) by 0 days.

(21) Appl. No.: 14/177,390

(22) Filed: Feb. 11, 2014

(65) Prior Publication Data
US 2014/0151911 A1    Jun. 5, 2014

Related U.S. Application Data

(62) Division of application No. 13/581,217, filed as application No. PCT/JP2011/000990 on Feb. 22, 2011, now abandoned.

(30) Foreign Application Priority Data

Feb. 24, 2010    (JP) .................................. 2010-038675

(51) Int. Cl.
*G02C 3/00*    (2006.01)
*G02C 7/12*    (2006.01)
(Continued)

(52) U.S. Cl.
CPC .... *B29D 11/00644* (2013.01); *B29C 45/14811* (2013.01); *G02B 5/3033* (2013.01);
(Continued)

(58) Field of Classification Search
CPC ............ G02B 27/28; G02B 5/30; G02B 1/04; G02B 1/08; G02B 5/1814; G02B 5/305; G02C 7/12; G02C 7/02; B29D 11/0073; B29C 2045/0079; B29C 45/561; B29L 2011/0016
USPC ............... 359/350, 490, 487.01, 487.06, 642; 428/312, 332, 522, 913, 412; 264/176.1, 1.1; 351/159.24, 159.56, 351/159.62; 427/162
See application file for complete search history.

(56) References Cited

U.S. PATENT DOCUMENTS 5,051,309 A * 9/1991 Kawaki et al. ................ 428/332
6,042,754 A * 3/2000 Yang et al. .................... 264/1.1
(Continued)

FOREIGN PATENT DOCUMENTS

JP    54 128356    10/1979
JP    64 22538    1/1989
(Continued)

OTHER PUBLICATIONS van Zuilichem, M.C.G. "Influence of Processing and Subsequent Annealing on the Ductile-Brittle Transition in PC". Technische Universiteit Eindhoven. Jun. 8, 2006.*
(Continued)

*Primary Examiner* — Suchin Parihar
*Assistant Examiner* — Collin X Beatty
(74) *Attorney, Agent, or Firm* — Oblon, Spivak, McClelland, Maier & Neustadt, L.L.P.

(57) ABSTRACT

The present invention relates to a polarizing lens molded by inserting a polarizing sheet bent into a sphere or an asphere after having an aromatic polycarbonate sheet bonded via an adhesive layer to both surfaces of a film with polarized nature into a mold, and injecting aromatic polycarbonate, wherein heat treatment at a temperature not less than a temperature of 50° C. lower than the glass transition point and less than the glass transition point for an appropriate time has been performed after injecting aromatic polycarbonate to approximate a designed value of the lens curvature.

6 Claims, 4 Drawing Sheets

(51) Int. Cl.
  *B29D 11/00* (2006.01)
  *B29C 45/14* (2006.01)
  *G02B 5/30* (2006.01)
  *B29C 45/72* (2006.01)
  *B29K 69/00* (2006.01)
  *B29K 669/00* (2006.01)
  *B29L 11/00* (2006.01)

(52) U.S. Cl.
  CPC ............. *G02C 7/12* (2013.01); *B29D 11/0073* (2013.01); *B29C 45/7207* (2013.01); *B29K 2069/00* (2013.01); *B29K 2669/00* (2013.01); *B29K 2715/006* (2013.01); *B29K 2995/0034* (2013.01); *B29L 2011/00* (2013.01); *B29L 2011/0016* (2013.01)
  USPC ............ 351/159.56; 351/159.62; 359/485.01; 359/487.01; 359/576; 264/1.1; 427/162

(56) References Cited

U.S. PATENT DOCUMENTS

| | | | | |
|---|---|---|---|---|
| 6,786,599 | B2* | 9/2004 | Hayashi | 351/159.56 |
| 7,118,806 | B2* | 10/2006 | Nishizawa et al. | 428/412 |
| 8,262,843 | B2* | 9/2012 | Fayolle | 156/322 |
| 2004/0012122 | A1* | 1/2004 | Nagaoka et al. | 264/328.7 |
| 2004/0125339 | A1* | 7/2004 | Phillips | 351/163 |
| 2004/0145701 | A1* | 7/2004 | Miniutti et al. | 351/159 |
| 2009/0002608 | A1* | 1/2009 | Kameyama et al. | 349/96 |
| 2010/0128217 | A1* | 5/2010 | Komada et al. | 351/49 |
| 2010/0134884 | A1* | 6/2010 | Johnson et al. | 359/487 |
| 2010/0134888 | A1* | 6/2010 | Korenaga et al. | 359/576 |
| 2012/0140323 | A1* | 6/2012 | Yajima et al. | 359/487.02 |

FOREIGN PATENT DOCUMENTS

| | | |
|---|---|---|
| JP | 3 39903 | 2/1991 |
| JP | 8 52817 | 2/1996 |
| JP | 8 313701 | 11/1996 |
| JP | 9 179076 | 7/1997 |
| JP | 2006 189565 | 7/2006 |
| JP | 2006 276721 | 10/2006 |
| JP | 2008 268618 | 11/2008 |
| JP | 2009 198580 | 9/2009 |
| WO | 2009 139478 | 11/2009 |

OTHER PUBLICATIONS

International Search Report Issued Mar. 29, 2011 in PCT/JP11/000990 Filed Feb. 22, 2011.

* cited by examiner

POLARIZING LENS MADE OF AROMATIC POLYCARBONATE

REFERENCE TO PRIOR APPLICATIONS

This application is a Continuation of U.S. application Ser. No. 13/581,217, filed Sep. 19, 2012; which is a 371 of PCT/JP2011/000990, filed Feb. 22, 2011. Priority to Japanese patent application 2010-038675, filed Feb. 24, 2010, is claimed and all are incorporated herein by reference.

TECHNICAL FIELD

The present invention relates to a polarizing lens made of aromatic polycarbonate molded by injecting aromatic polycarbonate into one surface of a polarizing sheet.

RELATED ART

A polarizing sheet made of polycarbonate, which is excellent in impact resistance and lightweight, is used for liquid crystal displays, windows of buildings and sunroofs of automobiles, and sunglasses and goggles for use in ocean sports, winter sports, fishing, and the like.

A polarizing sheet having an aromatic polycarbonate sheet as a protective layer bonded via an adhesive layer to both surfaces of a polarizing film of polyvinyl alcohol film stretched and dyed with a dichroic dye (hereinafter, aromatic polycarbonate polarizing sheet), which is particularly excellent in impact resistance and in addition has high heat resistance at the same time, is used in a polarizing lens for sunglasses and goggles obtained by bending processing and injection molding.

However, aromatic polycarbonate has, since it has a large photoelastic constant, problems in that when subjected to bending processing into a spheric or aspheric surface shape such as sunglasses and goggles, a colored interference pattern due to retardation easily occurs, this colored interference pattern detracts from the appearance, causes eyestrain and the like.

Also, a polarizing lens of an aromatic polycarbonate polarizing sheet bending processed into a spheric or aspheric surface shape has problems in that image distortion occurs due to thickness non-uniformity of the aromatic polycarbonate polarizing sheet, detracts from the appearance, and causes eyestrain and the like.

With respect to retardation occurring upon bending processing, an aromatic polycarbonate polarizing sheet having hidden a colored interference pattern by subjecting an aromatic polycarbonate sheet to be used for a protective layer to stretching treatment in advance to allow large retardation to occur (hereinafter, stretched polycarbonate polarizing sheet) is known (Patent Document 1), and among other polarizing lenses, it is used in a product excellent in appearance and eyestrain.

On the other hand, a polarizing lens molded by inserting a stretched polycarbonate polarizing sheet bending processed into a spheric or aspheric surface shape into a mold and injecting aromatic polycarbonate (hereinafter, aromatic polycarbonate polarizing lens), for the purpose of improving impact resistance further than the polarizing lens described above formed by bending processing a stretched polycarbonate polarizing sheet or forming a corrective lens with a focal power, is known (Patent Document 2).

An aromatic polycarbonate polarizing lens also has an advantage that thickness non-uniformity of a stretched polycarbonate sheet inserted becomes hidden as aromatic polycarbonate is injected to fill a mold, and is used in a product particularly excellent in impact resistance, appearance and eyestrain also in a lens without any focal power.

Meantime, in a lens obtained by filling a mold with thermosetting resin or thermoplastic resin as an aromatic polycarbonate polarizing lens, the shape and the thickness of each of both surfaces of the formed lens can be set freely by adjusting the surface shape of each mold for both surfaces and the gap between both surfaces accordingly, so the surface shape of a mold and the gap between both surfaces are set based on the optical design, in order for the focal power, the prism power, and the image distortion of the formed lens to be desired values.

Although the surface shape of the formed lens and the surface shape of the mold which are in contact with each other during molding are often identical, when very high accuracy is required in the surface shape of a lens, in order to compensate a decrease in the lens thickness and a change in the surface shape due to volume constriction occurred upon solidification of thermosetting resin or thermoplastic resin filled in a mold, the surface shape of each mold for both surfaces and the gap between both surfaces are sometimes fine adjusted accordingly.

As a mold for use in bending processing of an aromatic polycarbonate polarizing sheet, one with the same surface shape as the opposite surface to the surface contacting the injected aromatic polycarbonate in the finally obtained aromatic polycarbonate polarizing lens is used.

Moreover, among molds for use in injection molding of an aromatic polycarbonate polarizing lens, as a mold for the stretched polycarbonate polarizing sheet side, one with the same surface shape as the stretched polycarbonate polarizing sheet side in the finally obtained aromatic polycarbonate polarizing lens is also used, and as the other mold for use in injection molding, one with the same surface shape as the focal power and the prism power within the lens surface of the finally obtained aromatic polycarbonate polarizing lens based on the optical design to be desired values is used.

For example, if an aromatic polycarbonate polarizing lens which has no focal power or prism power, and is a sphere with the base curve of the stretched polycarbonate polarizing sheet side surface of 8 is wished to be finally obtained, while there is also a case where bending processing is performed twice or three times or more, the shape of the mold for use in the final bending processing is a sphere with the base curve of 8, among molds for use in injection molding, the shape of the mold of the stretched polycarbonate polarizing sheet side is also a sphere with the base curve of 8, and the other mold for use in injection molding is a sphere with the base curve of 8 or slightly larger than 8 and the center position thereof being slightly different to the mold of the stretched polycarbonate polarizing sheet side, i.e. the decentered surface shape is used.

Moreover, for example, if an aromatic polycarbonate polarizing lens which has no focal power or prism power, and is an ellipsoid with the base curve in the horizontal direction of the stretched polycarbonate polarizing sheet side surface of 6 and the base curve in the vertical direction of 4 is wished to be finally obtained, while there is also a case where bending processing is performed twice or three times or more, the shape of the mold for use in the final bending processing is an ellipsoid with the base curve in the horizontal direction of 6 and the base curve in the vertical direction of 4, among molds for use in injection molding, the shape of the mold of the stretched polycarbonate polarizing sheet side is also an ellipsoid with the base curve in the horizontal direction of 6 and the base curve in the vertical direction of 4, and the other mold for use in injection molding is an ellipsoid with the base curve in the horizontal direction of 6 or slightly larger than 6 and the base curve in the vertical direction of 4 or slightly larger than 4.

For further example, the surface shape of an aromatic polycarbonate polarizing lens is molded not only into a quadric surface such as a sphere, an ellipsoid or a paraboloid, but sometimes into a high order surface such as a quartic surface, and the curvatures in the horizontal direction and in the vertical direction are also sometimes different. However, the surface shape of an aromatic polycarbonate polarizing lens after injection molding may be widely different to the surface shape of a mold, and ways they are different are also various.

In a stretched polycarbonate polarizing sheet, when an aromatic polycarbonate polarizing lens is molded using a mold with a spheric surface shape, it is known that by using a stretched polycarbonate polarizing sheet with no or less stretch of an aromatic polycarbonate sheet on the side where aromatic polycarbonate is injected, the absolute value of the difference between the base curve in the vertical direction and the base curve in the horizontal direction of the formed polarizing lens (hereinafter, anisotropy of the base curves) is reduced (Patent Document 3).

An aromatic polycarbonate polarizing lens using a stretched polycarbonate polarizing sheet with no or less stretch of an aromatic polycarbonate sheet on the side where aromatic polycarbonate is injected (hereinafter, single side stretched polycarbonate polarizing sheet), which can form the lens surface shape with very high accuracy, is particularly excellent in impact resistance, appearance and eyestrain, and is used in a product with high accuracy in the lens surface shape.

On the surface of an aromatic polycarbonate polarizing lens thus formed, a hard coating, an antireflective coating and the like are formed accordingly, and then fixed to a frame by lens edging, drilling, screwing and the like to be sunglasses and goggles.

RELATED DOCUMENTS

Patent Documents

Patent Document 1: JP-A-H03-39903
Patent Document 2: JP-A-H08-52817
Patent Document 3: JP-A-H08-313701

SUMMARY OF THE INVENTION

Problem to be Solved by the Invention

As described above, an aromatic polycarbonate polarizing lens using a single side stretched polycarbonate polarizing sheet, which can form the lens surface shape with very high accuracy, is particularly excellent in impact resistance, appearance and eyestrain, and is used in a product with high accuracy in the lens surface shape.

However, there is a problem in that even with a single side stretched polycarbonate polarizing sheet, the difference in the surface shape due to processing conditions such as bending processing, injection molding, hard coating treatment and the like is great, and the surface shape with desired accuracy has not been able to be molded with a heating temperature and a heating time suitable for each processing such as bending processing, injection molding, hard coating treatment and the like.

Moreover, due to the complexity that the surface shape of an aromatic polycarbonate polarizing lens using a single side stretched polycarbonate polarizing sheet after injection molding varies depending on the surface shape of an injection mold, i.e. the desired surface shape obtained based on the optical design, and furthermore, varies depending on various processing conditions such as bending processing, injection molding, hard coating treatment and the like, it has not been comprehended how the surface shape changes depending on these individual processing conditions, and it has not even been predicted whether or not a surface shape with desired accuracy can be reached by selecting these individual processing conditions accordingly.

An aromatic polycarbonate polarizing lens using a stretched polycarbonate polarizing sheet has, needless to say, not been able to be molded into a surface shape with desired accuracy. When the accuracy of the surface shape of a polarizing lens is extremely low, due to the difference between the formed polarizing lens and the frame shape, a problem occurs in that it cannot be fixed to the frame after lens edging.

For example, a polarizing lens with a spheric surface shape and the base curve of 8 has a problem in that when the anisotropy of the base curves of the formed polarizing lens is above 0.25, fixing to a frame becomes difficult. Moreover, it should be specially mentioned about the influence of the shape accuracy that as the anisotropy of the base curves of the formed polarizing lens increases, a problem of not meeting the Resolving Power in American Standard ANSI-Z87.1 regarding safety glasses occurs. For example, a polarizing lens with a spheric surface shape and the base curve of 8 has a problem in that when the anisotropy of the base curves of the formed polarizing lens is above 0.1, the resolving power becomes less than 20, which does not fall under American Standard ANSI-Z87.1.

With no prior art document related to the relationship described above between the resolving power and the shape accuracy of a polarizing lens particularly present, the inventors have, as a result of devoted examinations, discovered that the relationship wherein the resolving power is low when the shape accuracy of the formed polarizing lens is low, and the resolving power is also high when the shape accuracy of the formed polarizing lens is high, and that the resolving power becomes not less than 20 when the accuracy of the surface shape of the polarizing lens is greatly increased to have the anisotropy of the base curves of not more than 0.1.

Also, an aromatic polycarbonate polarizing lens using a single side stretched polycarbonate polarizing sheet has a problem in that when light is incident from side where aromatic polycarbonate is injected, i.e. when light is incident from the opposite surface to the light incident surface in the actual use situation, a colored interference pattern due to retardation easily occurs, and this colored interference pattern detracts from the appearance upon display on store shelves, while causing no problem in the actual use.

Means for Solving the Problems

The present invention is a polarizing lens formed by bending a polarizing sheet having an aromatic polycarbonate sheet bonded via an adhesive layer to both surfaces of a film with polarized nature into a sphere or an asphere, and injecting aromatic polycarbonate into one surface of the polarizing sheet, wherein the retardation value of the aromatic polycarbonate sheet at least arranged on the opposite surface to the surface where aromatic polycarbonate is injected of the polarizing sheet is not less than 2000 nm and less than 20000 nm, the polarizing lens has been subjected to heat treatment at a temperature not less than a temperature of 50° C. lower than the glass transition point and less than the glass transition point after injecting aromatic polycarbonate, and the base curves in the horizontal direction and in the vertical direction of the polarizing lens after performing the heat treatment have each approximated a designed value as compared to before performing the heat treatment.

Moreover, in the polarizing lens described above, when the heat treatment temperature is X and the heat treatment time is Y, X ranges from 115 to 135° C., the relationship between the heat treatment temperature and time meets Formula 1, and the anisotropy of the base curves of the polarizing lens after performing the heat treatment is not more than 0.25.

$$15.6 \leq \text{Log}(Y) + 0.122X \leq 16.9 \quad (1)$$

Furthermore, in the polarizing lens described above, X ranges as described above, the relationship between the heat treatment temperature and time meets Formula 2, and the anisotropy of the base curves of the polarizing lens after performing the heat treatment is not more than 0.1.

$$16.1 \leq \text{Log}(Y) + 0.122X \leq 16.8 \quad (2)$$

Effect of the Invention

According to the present invention, it becomes possible to stably provide an aromatic polycarbonate polarizing lens with high shape accuracy.

With respect to a polarizing lens with a spheric surface shape, it becomes possible to stably provide one with the anisotropy of the base curves of not more than 0.25, and moreover, it becomes possible to stably provide one with a resolving power of not less than 20.

BRIEF DESCRIPTION OF THE DRAWINGS

The present invention will be described with reference to the accompanying drawings, wherein.

MODE FOR CARRYING OUT THE INVENTION

An aromatic polycarbonate polarizing lens of the invention will be described.

First, by impregnating a resin film as a base material of a polarizing film in a dye liquor containing a dye such as iodine or a dichroic dye, while stretching it in one direction, and dispersing iodine or a dichroic dye within a base material resin, a polarizing film with polarized nature imparted is obtained.

As a resin to be a base material of a polarizing film used here, polyvinyl alcohols are used, and as these polyvinyl alcohols, polyvinyl alcohol (hereinafter, PVA), polyvinyl formal, as one having a small amount of ester acetate structure of PVA remained and a PVA derivative or analog, polyvinyl acetal, an ethylene-vinyl acetate saponified copolymer and the like are preferable, and particularly PVA is preferable.

Moreover, with respect to the molecular weight of a PVA film, the weight average molecular weight of 50,000 to 500,000 is preferable from the perspective of stretchability and film strength, and particularly the molecular weight of 150,000 to 300,000 is preferable. Also, as a dye for a polarizing film used here, a direct dye comprising a azo color having a sulfonate group is preferable from the perspective of the dyeability of a PVA film and heat resistance. The ratio upon stretching a PVA film is preferable to be 2 to 8 times from the perspective of dichroic ratio and film strength after stretch, and particularly 3 to 5 times is preferable.

Next, a protective layer comprising an aromatic polycarbonate sheet is bonded via an adhesive layer to both surfaces of a polarizing film. As a resin material of the aromatic polycarbonate sheet used here, a polymer produced by a well known method from a bisphenol compound represented by 2,2-bis(4-hydroxyphenyl)alkane and 2,2-(4-hydroxy-3,5-dihalogenophenyl)alkane is preferable from the perspective of film strength, heat resistance, endurance or bending processability, the polymer backbone may contain a structural unit derived from fatty acid diol and a structural unit having an ester bonding, and particularly aromatic polycarbonate derived from 2,2-bis(4-hydroxyphenyl)propane is preferable.

Furthermore, with respect to the molecular weight of the aromatic polycarbonate sheet, the viscosity average molecular weight of 12,000 to 40,000 are preferable from the perspective of the molding of the sheet itself, and particularly 20,000 to 35,000 is preferable from the perspective of film strength, heat resistance, endurance or bending processability. Also, with respect to the retardation value of an aromatic polycarbonate sheet, the lower limit is not less than 2000 nm from the perspective of repression of a colored interference pattern, and the upper limit is not particularly set but preferable to be not more than 20000 nm from the perspective of film production, and particularly preferable to be not less than 4000 nm and not more than 20000 nm. While a colored interference pattern is more difficult to occur with a higher retardation value, a disadvantage is that the accuracy of a surface shape is lower with a higher retardation value.

However, regarding an aromatic polycarbonate polarizing lens of the invention, the accuracy of a surface shape can be increased even in a range where a retardation value is higher. In addition, with respect to the thickness of each protective layer comprising aromatic polycarbonate used for both surfaces, a range of 50 μm to 1.5 mm is preferable from the perspective of film strength, heat resistance, endurance or bending processability, and particularly a range of 100 μm to 800 μm is preferable.

As an adhesive used for bonding aromatic polycarbonate to both surfaces of a polarizing film, an acrylic resin based material, an urethane resin based material, a polyester resin based material, a melamine resin based material, an epoxy resin based material, a silicone based material and the like can be used, and particularly a two-component thermosetting urethane resin comprising a polyurethane prepolymer as an urethane resin based material and a setting agent is preferable from the perspective of transparency of the adhesive layer itself or upon adhesion and adhesiveness to aromatic polycarbonate. Thus, an aromatic polycarbonate polarizing sheet is obtained.

An aromatic polycarbonate polarizing sheet used in the aromatic polycarbonate polarizing lens of the invention is not limited to the aromatic polycarbonate polarizing sheet described above, but an aromatic polycarbonate polarizing sheet also having a photochromic function prepared by using an adhesive having a photochromic dye dissolved as an adhesive for adhering a polarizing film and aromatic polycarbonate as a protective layer may be used, and thus, the similar effect can be obtained with any polarizing lens molded by subjecting an aromatic polycarbonate sheet for use in a protective layer of a polarizing film to stretching treatment in advance to allow large retardation to occur, bending processing the stretched polycarbonate polarizing sheet into a spheric or aspheric surface shape, inserting it into a mold and injecting aromatic polycarbonate.

Next, the stretched polycarbonate polarizing sheet is subjected to bending processing.

Bending processing conditions of the stretched polycarbonate polarizing sheet are not particularly limited, but it is required to be bent along the mold surface for use in injection molding and also a polarizing film easily has cracking, so-called film breakage along the stretching direction in bending processing, and therefore the mold temperature in bending processing of the stretched polycarbonate polarizing sheet is preferable to be a temperature around the glass transition point of the aromatic polycarbonate used in the stretched polycarbonate polarizing sheet, in addition, preferable to be not less than a temperature of 50° C. lower than the glass transition point of the aromatic polycarbonate and less than the glass transition point in preheat treatment immediately before the bending processing, and particularly preferable to be not less than a temperature of 40° C. lower than the glass transition point and less than a temperature of 15° C. lower than the glass transition point.

Next, aromatic polycarbonate is injected into the stretched polycarbonate polarizing sheet.

Processing conditions of injection molding are not particularly limited, but it is required to be excellent in appearance, and therefore the mold temperature is preferable to be a temperature not less than a temperature of 50° C. lower than the glass transition point of the aromatic polycarbonate used in the stretched polycarbonate polarizing sheet and less than the glass transition point, and particularly preferable to be not less than a temperature of 40° C. lower than the glass transition point and less than a temperature of 15° C. lower than the glass transition point.

Next, heat treatment is performed, and then hard coating treatment is performed.

Before heat treatment, as a result of careful examinations on the processing conditions of the conventional techniques such as bending processing, injection molding, hard coating processing, and the like for solving the problems described above, the inventors have discovered that in an aromatic polycarbonate polarizing lens using a stretched polycarbonate polarizing sheet or a single side stretched polycarbonate polarizing sheet, the base curve in the horizontal direction is larger and the base curve in the vertical direction is smaller than the surface shape of an injection mold, i.e. a desired surface shape, and as a result of further detailed examinations, they have obtained findings that regarding the surface shape of an aromatic polycarbonate polarizing lens after injection molding, the base curve in the horizontal direction is large and the base curve in the vertical direction is small, and by performing hard coating treatment after injection molding, the base curve in the horizontal direction becomes smaller and the base curve in the vertical direction becomes larger to approximate the desired surface shape.

Materials or processing conditions of a hard coating are not particularly limited, but it is required to be excellent in adhesion to aromatic polycarbonate in appearance and substrate, or to an inorganic layer to be subsequently coated such as a miller coating, an antireflective coating and the like, and therefore the calcination temperature is preferable to be a temperature not less than a temperature of 50° C. lower than the glass transition point of the aromatic polycarbonate used in the stretched polycarbonate polarizing sheet and less than the glass transition point, and particularly preferable to be not less than a temperature of 40° C. lower than the glass transition point and less than a temperature of 15° C. lower than the glass transition point.

The horizontal direction of a polarizing lens herein means the direction on the polarizing lens surface parallel to the horizontal surface when fixed to sunglasses or goggles, and approximately corresponds to the absorption axis of a polarizing lens. Also, the vertical direction herein means the vertical direction to the horizontal surface when fixed to sunglasses or goggles, and approximately corresponds to the transmission axis of a polarizing lens Moreover, the inventors have, as a result of devoted examinations on various additional treatments in addition to processing conditions of the conventional techniques, discovered that by subjecting an aromatic polycarbonate polarizing lens molded by the conventional techniques to heat treatment before hard coating treatment, the base curve in the horizontal direction becomes smaller to approximate a desired surface shape and the base curve in the vertical direction becomes larger to approximate a desired surface shape, that by subjecting it to further heat treatment for long period of time, the base curve in the horizontal direction overtakes and becomes smaller than the desired surface shape and the base curve in the vertical direction overtakes and becomes larger than the desired surface shape, and that very high shape accuracy can be obtained when heat treatment for an appropriate time is performed, so as to reach the present invention.

A typical calcination temperature in hard coating treatment of an aromatic polycarbonate polarizing lens is not less than a temperature of 50° C. lower than the glass transition point of the aromatic polycarbonate sheet used in a protective layer of a stretched polycarbonate polarizing sheet or a single side stretched polycarbonate polarizing sheet and not more than the glass transition point, and more typically a temperature around 120° C., which is not less than a temperature of 40° C. lower than the glass transition point and not more than a temperature of 15° C. lower than the glass transition point, the time required for calcination of a hard coating is approximately between 30 minutes and 2 hours, and in an aromatic polycarbonate polarizing lens molded under these typical processing conditions, the base curve in the horizontal direction is larger and the base curve in the vertical direction is smaller than the surface shape of an injection mold, i.e. a desired surface shape, so a surface shape with high accuracy cannot be obtained.

More specifically, in an aromatic polycarbonate polarizing lens molded under typical processing conditions as the conventional techniques, one with high shape accuracy cannot be obtained.

By a method of performing heat treatment before hard coating treatment as a technique of the present invention, even in an aromatic polycarbonate polarizing lens molded under typical processing conditions, the base curve in the horizontal direction becomes smaller to approximate a desired surface shape and the base curve in the vertical direction becomes larger to approximate a desired surface shape. However, when heat treatment for an excessively long time is performed, the base curve in the horizontal direction becomes smaller than the desired surface shape and the base curve in the vertical direction becomes larger than the desired surface shape.

As a matter of course, when heat treatment for an appropriate time is performed, the base curves in the horizontal direction and in the vertical direction become values closely approximate to a desired surface shape, and a surface shape with very high accuracy, which has not been able to be obtained by the conventional techniques, can be obtained by the present invention. In addition, the inventors have, as a result of devoted examinations on controllability of appropriate heat treatment to be performed before hard coating treatment for obtaining a surface shape with very high accuracy, discovered that the amount of change of the curve value per unit heating time resulted from heat treatment before hard coating treatment tends to gradually decrease as the heating time increases.

Moreover, it has been discovered that the amount of change of the base curve per unit heating time resulted from heat treatment before hard coating treatment varies depending on the treatment temperature in bending processing or the mold temperature in injection molding, and the higher these temperatures are, the less the amount of change of the base curve is, per unit heating time resulted from heat treatment after hard coating treatment. Furthermore, it has been discovered that in heat treatment before hard coating treatment, as the heating temperature is increased, the amount of change of the base curve per unit heating time increases, and as the heating temperature is decreased, the amount of change of the base curve per unit heating time decreases.

Also, is has been discovered that although regarding the surface shape after injection molding, the base curve in the horizontal direction is larger and the base curve in the vertical direction is smaller than the surface shape of an injection mold, i.e. a desired surface shape, the degree thereof changes depending on the mold temperature in injection molding, the degree becomes high when the mold temperature is high, and it becomes low when the mold temperature is low. When a surface shape is wished to be controlled with high accuracy, the amount of change of the base curve, when substantially corresponding to the desired surface shape, per unit heating time is preferable to be small. On the other hand, when the thoughput in production is wished to be improved, in order to shorten the time required for heat treatment, the amount of change of the base curve at the initial stage of heat treatment per unit heating time is preferable to be large, or the surface shape before heat treatment is preferable to be approximate to the desired surface shape.

From these points, it has been discovered that by appropriately selecting the treatment temperature in bending processing, the mold temperature in injection molding, or the temperature of heat treatment after hard coating treatment, one with very high shape accuracy can be highly reproducibly obtained with heat treatment for a certain time, or one with very high shape accuracy can be highly reproducibly obtained even with heat treatment for a short time.

More specifically, it has been reached to find out that regarding an aromatic polycarbonate polarizing lens using a stretched polycarbonate polarizing sheet or a single side stretched polycarbonate polarizing sheet, by a method of accordingly performing heat treatment at a temperature not more than the glass transition point before a hard coating treatment, it can be molded into the surface shape of an injection mold, i.e. a desired surface shape with desired accuracy.

Moreover, it has been reached to find out that by a method of appropriately selecting the treatment temperature in bending processing, the mold temperature in injection molding, or the temperature of heat treatment after hard coating treatment, with heat treatment for a short time, or with heat treatment for a certain time, one with very high shape accuracy can be highly reproducibly molded.

As a result, with respect to a polarizing lens with a spheric surface shape, it has become possible to stably mold one with the anisotropy of the base curves of not more than 0.25, and additionally with respect to a polarizing lens with a spheric surface shape, it has become possible to stably mold one with a resolving power of not less than 20.

It should be noted that although the description of examples illustrates that heat treatment is performed before hard coating treatment, this heat treatment may be performed at any stage as long as it is after injection molding, for example, it may be performed after hard coating treatment, and additionally it may be performed after coating an inorganic layer such as a miller coating, an antireflective coating, and the like. Also, although the description in examples illustrates that heat treatment is performed before hard coating treatment, by selecting the heating temperature and the heating time of heat treatment accordingly, it may be carried forward to heat treatment in hard coating calcination.

For example, when the heating temperature in hard coating calcination is 120° C. and the heating time is 2 hours and the subsequent heat treatment is at 120° C. for 10 hours, in order to obtain a surface shape with high accuracy, hard coating calcination may be performed at the heating temperature of 120° C. for the heating time of 12 hours. In addition, regarding an aromatic polycarbonate polarizing lens without any hard coating, hard coating treatment may be, needless to say, omitted to perform heat treatment.

With respect to conditions of heat treatment, the heating temperature is preferable to be a temperature not less than a temperature of 50° C. lower than the glass transition point of the aromatic polycarbonate used in the stretched polycarbonate polarizing sheet and less than the glass transition point, and particularly preferable to be not less than a temperature of 40° C. lower than the glass transition point and less than a temperature of 15° C. lower than the glass transition point. With respect to the heating time, in order to obtain a desired surface shape with desired accuracy as describe above, the conditions set accordingly are followed.

EXAMPLES

Below, although the present invention will be described in details based on examples, the invention is not limited to these examples.

Example 1

(a) Stretched Polycarbonate Polarizing Sheet

As a stretched polycarbonate polarizing sheet for use in an aromatic polycarbonate polarizing lens, Iupilon Pola sheet with a thickness of 0.6 mm (made by Mitsubishi Gas Chemical Company) was used. The stretched polycarbonate polarizing sheet uses an aromatic polycarbonate sheet with a thickness of 0.3 mm, a retardation value of 5500 nm, and a glass transition point of 150° C. as a protective layer on both surfaces of the polarizing film, and is a polarizing sheet less likely to have a colored interference pattern occur in bending processing.

(b) Aromatic Polycarbonate Polarizing Lens

The polarizing sheet of (a) was punched out with a complete round die with a diameter of 79.5 mm, the width in the vertical direction was cut into 55 mm, and bending processing was performed so as to correspond to the spheric surface (curvature radius 66.81 mm, base curve 7.932) of the mold used in injection molding, using a mold with the same surface shape. The base curve herein is used in the meaning of the curvature of the front surface, and means a value of 530 divided by a curvature radius in millimeter unit.

Moreover, an aromatic polycarbonate polarizing lens was prepared by inserting it into a mold for injection molding and injection molding a molten resin in the concave surface of the lens. Molding conditions of the aromatic polycarbonate polarizing lens here are shown in Table 1.

In injection molding, [1] to [8] were molded using a mold capable of forming two aromatic polycarbonate polarizing lenses simultaneously in one injection, and [9] was molded using a mold capable of forming four aromatic polycarbonate polarizing lenses simultaneously in one injection.

The difference between these two kinds of molds is only the number of aromatic polycarbonate polarizing lenses capable of being molded simultaneously in one injection, the surface shape of each mold is identical, and they are designed to be approximately equal in the gate shape and the runner length.

(c) Measurement of Curvature Radius And Base Curve of Formed Lens

The curvature radii in the horizontal direction and in the vertical direction for [1] to [9] aromatic polycarbonate polarizing lenses formed in (b) were measured with a three-point curve meter (DIAL GAUGE made by PEACOCK).

(d) Measurement of Resolving Power of Formed Polarizing Lens

The resolving power for [1] to [9] aromatic polycarbonate polarizing lenses formed in (b) was measured by a method described in "14.10 Refractive Power, Resolving Power and Astigmatism Tests" within American Standard ANSI-Z87.1.

Among aromatic polycarbonate polarizing lenses obtained in the above (b), aromatic polycarbonate polarizing lenses from [1] to [3] were subjected to heat treatment at 120° C. for up to 96 hours using a forced hot air circulation oven.

The change of the base curve relative to the heating time for aromatic polycarbonate polarizing lenses from [1] to [3] was measured for 10 samples each, and the average value for each time is shown in Table 2.

In any of aromatic polycarbonate polarizing lenses from [1] to [3], a value of the base curve in the horizontal direction minus the base curve in the vertical direction (hereinafter, difference between the base curves) becomes not less than +0.4 after injection molding, the difference between the base curves decreases with heat treatment for 1 to 2 hours, but there are still some with not less than +0.3.

This heat treatment for 1 to 2 hours corresponds to calcination conditions of a hard coating of the conventional techniques.

Moreover, as the heating time was increased, the difference between the base curves decreased, in any of aromatic polycarbonate polarizing lenses from [1] to [3], the difference between the base curves became not more than +0.1 by heat treatment for 12 to 48 hours, as heat treatment was further continued, the difference between the base curves slowly decreased, and after heat treatment for 96 hours, the different between the base curves reached not more than −0.1 with the minus sign reversed to the immediate post injection molding.

This result shows that by performing appropriate heat treatment, the anisotropy of the base curves can be made very small, and that while the appropriate heat treatment varies depending on molding conditions, the anisotropy of the base curves can be made very small in all molding conditions. In addition, when the resolving power was measured for aromatic polycarbonate polarizing lenses with the anisotropy of the base curves of not more than 0.1, they were all not less than 20.

Example 2

An aromatic polycarbonate polarizing lens from [2] obtained in the above (b) was subjected to heat treatment at a temperature of 130° C. using a forced hot air circulation oven for the time until the resolving power became not less than 20. At the heating temperature of 130° C., the resolving power became not less than 20 in the heating time of 1 hour.

In addition, when the base curves of the aromatic polycarbonate polarizing lens with a resolving power of not less than 20 were measured, the anisotropy of the base curves was not more than 0.1.

While the heating temperature was 120° C. and the heating time required for the anisotropy of the base curves to be not more than 0.1 was 12 to 48 hours in Example 1, the anisotropy of the base curves became not more than 0.1 in the heating time of 1 hour in Example 2.

Thus, by a method of appropriately selecting the temperature of heat treatment, an aromatic polycarbonate polarizing lens with very high shape accuracy could be molded with heat treatment for a short time.

Reference Example 1

Aromatic polycarbonate polarizing lenses prepared under each injection molding condition of the above (b) were heat treated at 120° C. for 1 hour using a forced hot air circulation oven. This heat treatment corresponds to calcination conditions of a hard coating of the conventional techniques.

The base curves of aromatic polycarbonate polarizing lenses before and after heat treatment were measured for 10 samples each, and the average values are shown in Table 3.

In aromatic polycarbonate polarizing lenses from all molding conditions [1] to [9], while the anisotropy of the base curves could be reduced after heat treatment as compared to the immediate post injection molding, it could not sufficiently be reduced for some molding conditions.

In these molding conditions, while there were molding conditions where the anisotropy of the base curves became not more than 0.25, this is the average value of 10 samples, all samples did not necessarily become not more than 0.25 in these molding conditions, and there were samples above 0.25.

Also, in these molding conditions, while there were molding conditions where the anisotropy of the base curves became not more than 0.1, this is the average value of 10 samples, all samples did not necessarily become not more than 0.1 in these molding conditions, and there were samples above 0.1.

This result shows that although the anisotropy of the base curves cannot sufficiently be reduced in calcination conditions of a hard coating of the conventional techniques, by further performing appropriate heat treatment, the anisotropy of the base curves can be remarkably reduced.

It is clear from the results of Examples 1 and 2 that by further subjecting aromatic polycarbonate polarizing lenses from [1] to [9] of Reference Example 1 to appropriate heat treatment, the anisotropy of the base curves can be further reduced. More specifically, it is clear that while appropriate heat treatment varies depending on molding conditions, the anisotropy of the base curves of an aromatic polycarbonate polarizing lens can be reduced in all molding conditions.

TABLE 1

| Sample No. | Number of curved surfaces within mold | Measured value [mm] | Cylinder temperature [° C.] | Mold temperature [° C.] | Injection rate [mm/s] | Pressure kept [MPa] | V-P switching position [mm] | Base curve (curvature radius) |
|---|---|---|---|---|---|---|---|---|
| [1] | 2 | 42 | 300 | 80  | 30  | 60   | 7  | 8 |
| [2] |   | 42 | 300 | 100 | 30  | 60   | 8  | (66.81 mm) |
| [3] |   | 42 | 300 | 120 | 30  | 60   | 8  |  |
| [4] |   | 35 | 300 | 30  | 100 | 100  | 10 |  |
| [5] |   | 35 | 300 | 50  | 100 | 100  | 10 |  |
| [6] |   | 35 | 300 | 70  | 50  | 100  | 10 |  |
| [7] |   | 35 | 300 | 85  | 20  | 60   | 4  |  |
| [8] |   | 35 | 300 | 120 | 20  | 60   | 4  |  |
| [9] | 4 | 62 | 300 | 110 | 84  | 62.5 | 20 |  |

TABLE 2

| | [1] Base curve | | [2] Base curve | | [3] Base curve | |
|---|---|---|---|---|---|---|
| Heat treatment time [hour] | Horizontal direction | Vertical direction | Horizontal direction | Vertical direction | Horizontal direction | Vertical direction |
| 0 (post molding) | 8.07 | 7.62 | 8.07 | 7.63 | 8.10 | 7.58 |
| 1  | 7.94 | 7.73 | 7.99 | 7.73 | 7.96 | 7.70 |
| 2  | 8.00 | 7.64 | 7.91 | 7.79 | 7.96 | 7.69 |
| 4  | 7.91 | 7.77 | 7.95 | 7.76 | 7.92 | 7.71 |
| 8  | 7.91 | 7.79 | 7.92 | 7.84 | 7.95 | 7.70 |
| 12 | 7.91 | 7.77 | 7.93 | 7.82 | 7.88 | 7.78 |
| 24 | 7.92 | 7.74 | 7.85 | 7.94 | 7.89 | 7.83 |
| 48 | 7.83 | 7.86 | 7.82 | 7.90 | 7.86 | 7.85 |
| 96 | 7.59 | 8.07 | 7.64 | 8.05 | 7.71 | 8.01 |

TABLE 3

| Heat treatment time [hour] | Horizontal direction | Vertical direction | Horizontal direction | Vertical direction | Horizontal direction | Vertical direction |
|---|---|---|---|---|---|---|
|   | [1] Base curve | | [2] Base curve | | [3] Base curve | |
| 0 (post molding) | 8.07 | 7.62 | 8.07 | 7.63 | 8.10 | 7.58 |
| 1 | 7.94 | 7.73 | 7.99 | 7.73 | 7.96 | 7.70 |
|   | [4] Base curve | | [5] Base curve | | [6] Base curve | |
| 0 (post molding) | 8.03 | 7.67 | 8.08 | 7.56 | 8.11 | 7.49 |
| 1 | 7.79 | 8.00 | 7.94 | 7.77 | 7.99 | 7.63 |
|   | [7] Base curve | | [8] Base curve | | [9] Base curve | |
| 0 (post molding) | 7.98 | 7.62 | 7.94 | 7.62 | 8.14 | 7.54 |
| 1 | 7.93 | 7.72 | 7.93 | 7.62 | 7.90 | 7.85 |

Example 3

(e) Single Side Stretched Polycarbonate Polarizing Sheet A

Single side stretched polycarbonate polarizing sheet A used a polycarbonate sheet with a thickness of 0.3 mm and a retardation value of 5500 nm as a protective layer on one surface of a polarizing film, and used a polycarbonate sheet with a thickness of 0.3 mm and a retardation value of not more than 100 nm as a protective layer on the other surface of the polarizing film.

An aromatic polycarbonate polarizing lens prepared under the same conditions as [3] of the above (b), except that the polarizing sheet of (e) was used, was subjected to heat treatment at a temperature of 120° C., 125° C. and 130° C. for various times using a forced hot air circulation oven, and each base curve in the horizontal direction and in the vertical direction at each heat treatment time was measured with a stylus type contour shape measuring instrument (Contour Record 2700SD3 made by Tokyo Seimitsu).

The contour shape measuring instrument, as compared to the above mentioned curve meter, applies an extremely low load to an object to be measured upon measurement and can measure a base curve more accurately.

Figure 1:
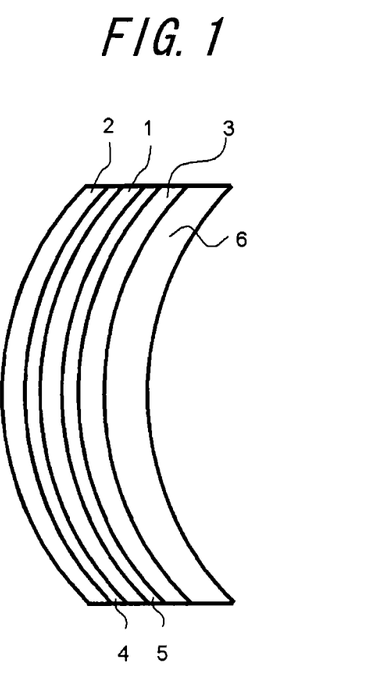
FIG. 1 is a cross-sectional view of an aromatic polycarbonate polarizing lens of the invention.
Figure 2:
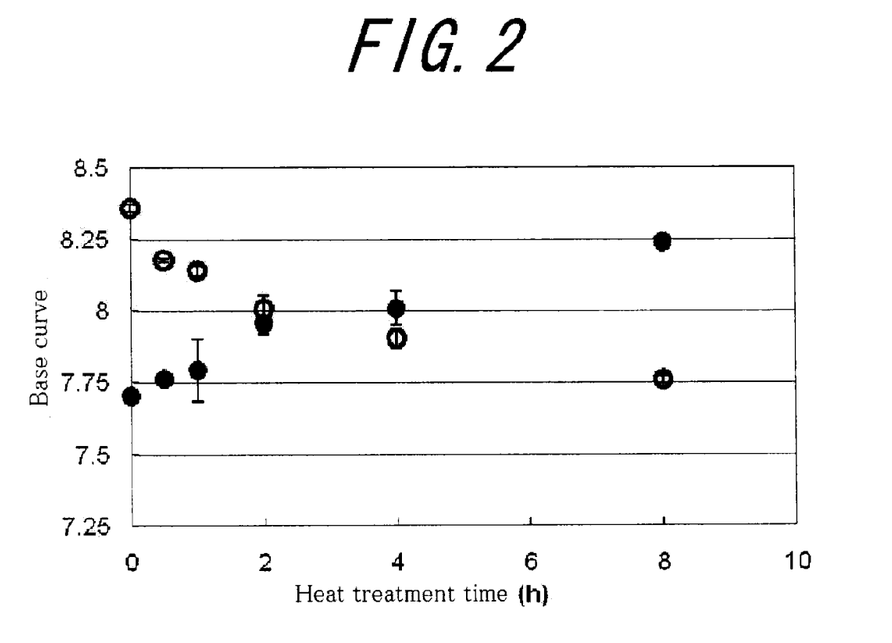
FIG. 2 shows the relationship between the heat treatment time and the base curve, when the heat treatment temperature is 130° C.

As one example to show how the base curve changes depending on the heat treatment time, the change of each base curve in the horizontal direction and in the vertical direction depending on the heat treatment time at the heat treatment time of 130° C. is shown in FIG. 2 with a white circle representing a horizontal component and a black circle representing a vertical component.

Similar figures were made for the other heat treatment temperatures, and the result of reading heat treatment times where the difference between the base curves becomes approximately +0.25, +0.1, 0, −0.1 and −0.25 is shown in Table 4. The heat treatment times were up to 96 hours at the heat treatment temperature of 120° C., up to 15 hours at the heat treatment temperature of 125° C., and up to 8 hours at the heat treatment temperature of 130° C. Therefore, when the amount of change of the base curve was insufficient and the difference between the base curves did not reach the above values, the maximum time of heat treatment is shown with an inequality sign and a bracket. Also, when the difference between the base curves could not be clearly read from the figure made, a value is shown in a bracket.

TABLE 4

|  |  | Heat treatment temperature | | |
| --- | --- | --- | --- | --- |
|  |  | 120° C. | 125° C. | 130° C. |
| Difference | 0.25 | 10 | 9 | 1.5 |
| between | 0.1 | 35 | 10 | 2 |
| base | 0 | 50 | 11 | 3 |
| curves | −0.1 | (65) | (12) | 4 |
|  | −0.25 | (90) | (13) | 6 |

Example 4

(f) Single Side Stretched Polycarbonate Polarizing Sheet B

Single side stretched polycarbonate polarizing sheet B used a polycarbonate sheet with a thickness of 0.4 mm and a retardation value of 5500 nm as a protective layer on one surface of a polarizing film, and used a polycarbonate sheet with a thickness of 0.3 mm and a retardation value of not more than 100 nm as a protective layer on the other surface of the polarizing film.

Preparation and heat treatment were performed in the same manner as Example 3, except that the polarizing sheet of (f) was used, the base curve was measured, a figure showing the change of the base curve depending on the heat treatment time was made, and the result of reading the difference between the base curves from the figure is shown in Table 5.

TABLE 5

|  |  | Heat treatment temperature | | |
| --- | --- | --- | --- | --- |
|  |  | 120° C. | 125° C. | 130° C. |
| Difference | 0.25 | 20 | 12 | 1 |
| between | 0.1 | 45 | (15<) | 2 |
| base | 0 | 70 | (15<) | 4 |
| curves | −0.1 | (95) | (15<) | 3 |
|  | −0.25 | (96<) | (15<) | 5 |

Example 5

Preparation and heat treatment were performed in the same manner as Example 3, except that the polarizing sheet of (a) was used, the base curve was measured, a figure showing the change of the base curve depending on the heat treatment time was made, and the result of reading the difference between the base curves from the figure is shown in Table 6.

While the heat treatment times were up to 15 hours at the heat treatment temperature of 125° C. and up to 8 hours at the heat treatment temperature of 130° C. in Example 3, the heat treatment times were up to 48 hours at the heat treatment temperature of 125° C. and up to 12 hours at the heat treatment temperature of 130° C. in Example 5.

TABLE 6

|  |  | Heat treatment temperature | | |
| --- | --- | --- | --- | --- |
|  |  | 120° C. | 125° C. | 130° C. |
| Difference | 0.25 | 90 | 4 | 2 |
| between | 0.1 | (96<) | 9 | 5 |
| base | 0 | (96<) | (20) | 6 |
| curves | −0.1 | (96<) | (31) | (7) |
|  | −0.25 | (96<) | (36) | (10) |

Figure 3:
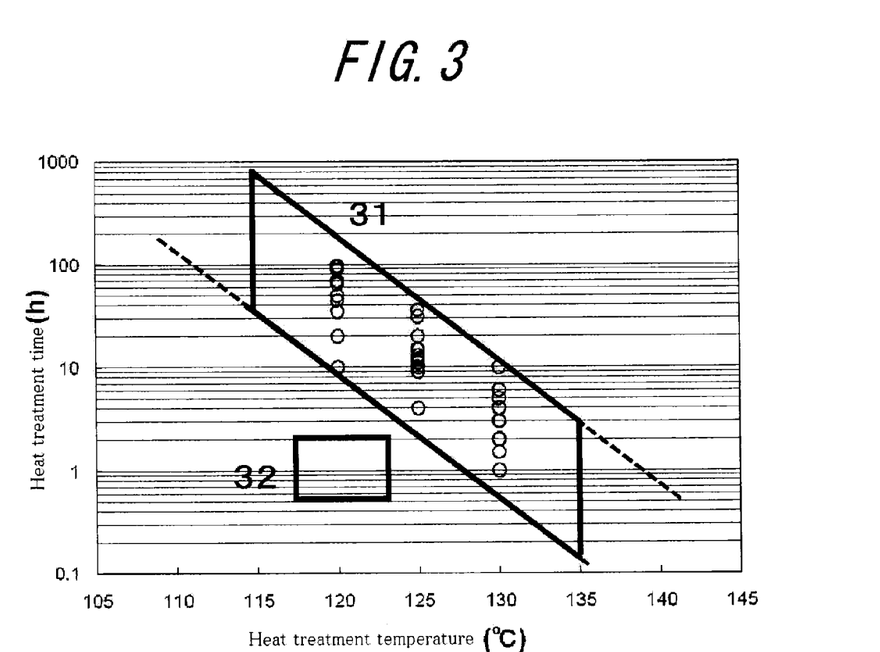
FIG. 3 shows the relationship between the heat treatment temperature and the heat treatment time, when the anisotropy of the base curves is not more than 0.25.

The result of plotting the heat treatment temperatures and the heat treatment times of Tables 4 to 6 in a single logarithmic chart is shown in FIG. 3. In FIG. 3, the range where the anisotropy of the base curves becomes not more than 0.25 is a range surrounded by an approximate parallelogram as shown, and regarding an aromatic polycarbonate polarizing lens, by performing heat treatment with a temperature and a time within this range after injection molding, a polarizing lens with high shape accuracy can be obtained.

Additionally, in FIG. 3, heat treatment temperature and heat treatment times in the typical hard coating calcination described above are also shown. This range is a range surrounded by an approximate rectangle, and different from the heat treatment conditions of the invention.

Figure 4:
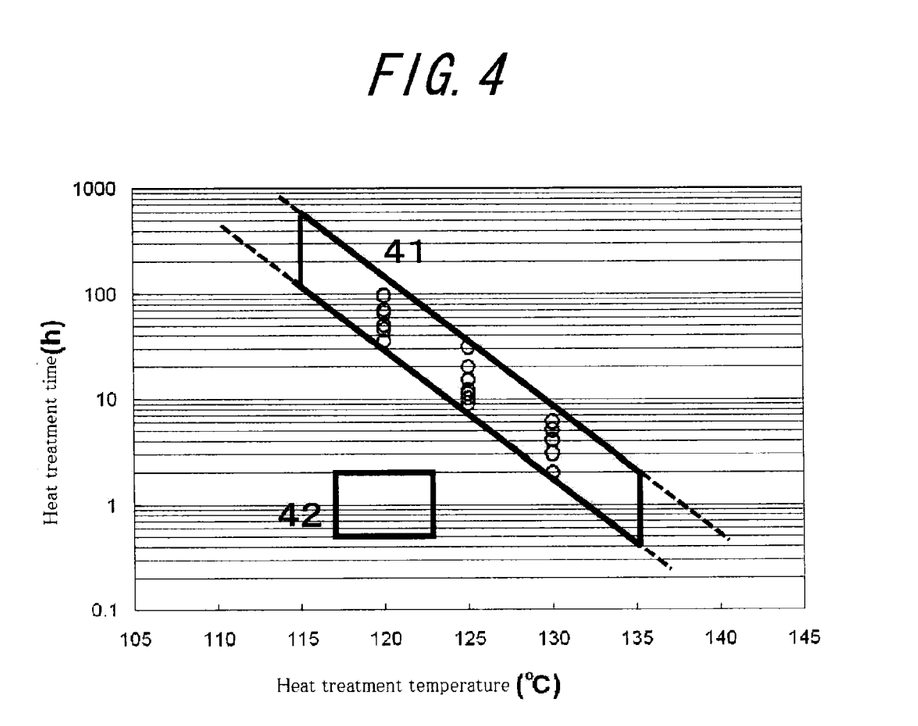
FIG. 4 shows the relationship between the heat treatment temperature and the heat treatment time, when the anisotropy of the base curves is not more than 0.10.

The result of plotting only the heat treatment temperatures and the heat treatment times where the difference between the base curves becomes +0.1, 0 and −0.1 in Tables 4 to 6 in a single logarithmic chart is shown in FIG. 4. In FIG. 4, the range where the anisotropy of the base curves becomes not more than 0.1 is a range surrounded by an approximate parallelogram as shown, and regarding an aromatic polycarbonate polarizing lens, by performing heat treatment with a temperature and a time within this range after injection molding, a polarizing lens with high shape accuracy and a high resolving power can be obtained.

EXPLANATION OF REFERENCES

1 Polarizing film
2, 3 Aromatic polycarbonate sheet
4, 5 Adhesive layer
6 Aromatic polycarbonate
31 The range of heat treatment temperatures and heat treatment times where the anisotropy of the base curves of a polarizing lens after performing heat treatment becomes not more than 0.25 is shown by a parallelogram with a solid line.
32 The range of heat treatment temperatures and heat treatment times in typical hard coating calcination is shown by a rectangle.
41 The range of heat treatment temperatures and heat treatment times where the anisotropy of the base curves of a polarizing lens after performing heat treatment becomes not more than 0.1 is shown by a parallelogram with a solid line.
42 The range of heat treatment temperatures and heat treatment times in typical hard coating calcination is shown by a rectangle.

What is claimed is:

1. A method for producing a polarizing lens, the method comprising:

(a) bending a polarizing sheet onto a spherical or aspherical surface, wherein the polarizing sheet comprises (i) a polarizing film and (ii) two aromatic polycarbonate sheets comprising a first aromatic polycarbonate, wherein a first of the two aromatic polycarbonate sheets is bonded via an adhesive layer to a first surface of the polarizing film, and a second of the two aromatic polycarbonate sheets is bonded via an adhesive layer to a second surface of the polarizing film, wherein a viscosity-average molecular weight of the first and/or second aromatic polycarbonates is from 12,000 to 40,000;

(b) injecting a second aromatic polycarbonate onto one surface of the bent polarizing sheet; and then (c) heat treating the bent polarizing sheet at a temperature in a range from 15° C. less than to 40° C. less than a glass transition temperature of the first aromatic polycarbonate;

to obtain a polarizing lens, wherein:

wherein when a heat treatment temperature, in ° C., is X and a heat treatment time, in hours, is Y, and X is in a range from 115° C. to 135° C., a relationship between the heat treatment temperature and heat treatment time satisfies Formula 1, $$15.6 \leq \text{Log}(Y) + 0.122X \leq 16.9 \quad (1)$$

and an anisotropy of base curves in the horizontal direction and in the vertical direction of the polarizing lens after the heat treating is not more than 0.25, and a retardation value of the aromatic polycarbonate sheet disposed on an opposite surface to the surface where the second aromatic polycarbonate was injected is in a range from 2000 nm to 20000 nm.

2. The method of claim 1, wherein the relationship between X and Y satisfies Formula 2, $$16.1 \leq \text{Log}(Y) + 0.122X \leq 16.8 \quad (2)$$

and the anisotropy of the base curves in the horizontal direction and in the vertical direction of the polarizing lens after the heat treating is not more than 0.1.

3. The method of claim 1, wherein the first and second aromatic polycarbonates are the same kind of aromatic polycarbonate.

4. The method of claim 1, wherein a viscosity-average molecular weight of the first and/or second aromatic polycarbonates is from 20,000 to 35,000.

5. The method of claim 1, wherein a thickness of each of the two aromatic polycarbonate sheets is from 50 μm to 1.5 mm.

6. The method of claim 1, wherein a thickness of each of the two aromatic polycarbonate sheets is from 100 μm to 800 μm.

* * * * *